(No Model.)
W. G. PEARSON.
FEED MIXER.
No. 603,537. Patented May 3, 1898.
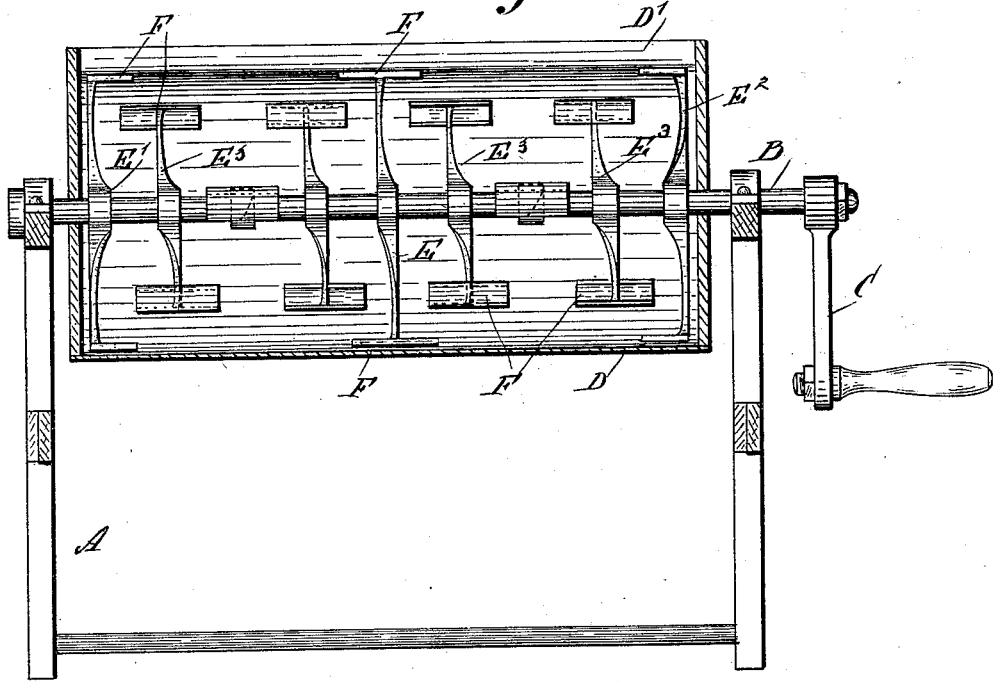
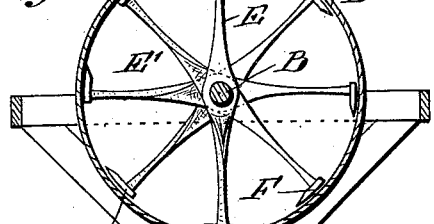
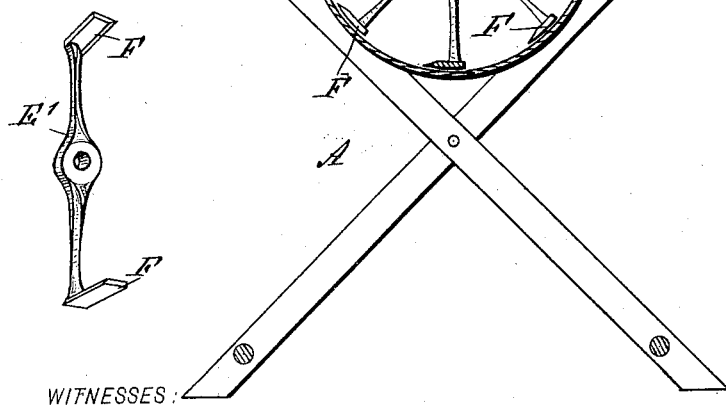
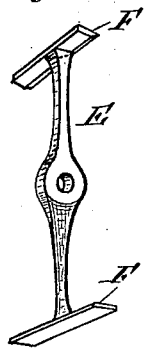
WITNESSES:
Otto Spieth.
Geo. J. Foster.
INVENTOR
W. G. Pearson.
BY
Munn & Co.
ATTORNEYS.

UNITED STATES PATENT OFFICE.

WALTER G. PEARSON, OF NEWBURYPORT, MASSACHUSETTS.

FEED-MIXER.

SPECIFICATION forming part of Letters Patent No. 603,537, dated May 3, 1898.

Application filed July 17, 1897. Serial No. 644,947. (No model.)

*To all whom it may concern:*

Be it known that I, WALTER GUY PEARSON, of Newburyport, in the county of Essex and State of Massachusetts, have invented a new and Improved Feed-Mixer, of which the following is a full, clear, and exact description.

The object of the invention is to provide a new and improved feed-mixer more especially designed for mixing mash used as feed for poultry, cattle, swine, and other animals, the mixer being simple and durable in construction, very effective in operation, and arranged to properly mix the feed and keep the same soft and crumbly without kneading or hardening it.

This invention consists in a peculiar combination that will be fully described hereinafter and defined in the claim.

Reference is to be had to the accompanying drawings, forming a part of this specification, in which similar characters of reference indicate corresponding parts in all the figures.

Figure 1 is a sectional side elevation of the improvement. Fig. 2 is a transverse section of the same, and Figs. 3 and 4 are perspective views of some of the mixing-arms.

The improved feed-mixer is mounted on a suitably-constructed frame A, carrying journals for a shaft B, provided at one end with a crank-arm C, adapted to be taken hold of by the operator for turning the said shaft. The shaft B extends through and supports a mixing-chamber D, preferably made cylindrical, with an opening D' at the top for receiving the mash or like material to be mixed within the chamber by arms E, E', $E^2$, and $E^3$, secured on the shaft B and provided at their outer ends with knives F, as shown in the drawings.

The arm E, located in the middle of the mixing-chamber, has its sides beveled in opposite directions on opposite sides of the shaft B, so as to cause a portion of the material to be thrown by one side of the arm in one direction toward one head of the chamber and by the side of the other arm toward the other head of the chamber. The end arms E' and $E^2$ have both sides beveled rearwardly, so as to throw the material toward the middle of the chamber, and the intermediate arms $E^3$ are similar to the middle arm E to throw part of the material toward one end and part toward the other end.

The knives F have their cutting edges forward—that is, in the direction in which the arms are traveling—so as to cut into the material and lift the same without danger of kneading the material and hardening it.

Now it will be seen that when the shaft B is rotated the knives easily cut through the material and the arms cause the material to move from the ends of the mixing-chamber toward the center or middle and from the center back to the ends to insure a proper mixing of all the substances forming the mash. When the mash has been properly mixed, the chamber D is given a half-turn on the shaft B, so as to bring the opening D' to the bottom and allow the feed to run into a suitable vessel. The empty mixing-chamber D is then returned to its former position and is again filled with new material to be stirred and mixed in the manner above described.

When using the apparatus, the feed is inserted through the orifice D' and the chamber D is held with the orifice uppermost during the period that the shaft B is revolved to mix the food. Then when the mixing operation is complete the chamber D is permitted to turn one-half revolution, so as to throw the orifice D' downwardly and permit the discharge of the feed.

Having thus fully described my invention, I claim as new and desire to secure by Letters Patent—

In a feed-mixer, the combination of a frame, a shaft revolubly mounted therein, a cylinder forming a chamber, the cylinder being mounted axially on the shaft so that its walls will be concentric thereto, a series of arms fixed to the shaft and located within the chamber, the arms being connected to the shaft at their middles so that each end of each arm will be in proximity with the inner sides of the said chamber, each end portion of each arm having its sides beveled in opposite directions so as to cause a portion of the material to be thrown by one side of the arm in one direction, and a second portion of the material to be thrown by the other side of the arm in an opposite direction, and a knife carried by each end of each arm, the knives lying flat against the inner sides of the chamber so as to scrape the feed therefrom.

WALTER G. PEARSON.

Witnesses.
LAURA E. GREENE,
JOHN T. MANSON.